(12) United States Patent
Mambakkam et al.

(10) Patent No.: US 6,903,727 B2
(45) Date of Patent: Jun. 7, 2005

(54) INTEGRATED VIRTUAL HUB CHIP

(75) Inventors: Sreenath Mambakkam, San Jose, CA (US); Arockiyaswamy Venkidu, Menlo Park, CA (US); Larry Lawson Jones, Palo Alto, CA (US)

(73) Assignee: OnSpec Electronic Inc., Santa Clara, CA (US)

( * ) Notice: Subject to any disclaimer, the term of this patent is extended or adjusted under 35 U.S.C. 154(b) by 0 days.

(21) Appl. No.: 10/065,333

(22) Filed: Oct. 4, 2002

(65) Prior Publication Data

US 2005/0083305 A1 Apr. 21, 2005

(51) Int. Cl.[7] .............................. G09G 5/00; G09G 5/08
(52) U.S. Cl. ........................ 345/168; 345/156; 345/160
(58) Field of Search ................... 345/156–168; 710/8, 15, 62, 63, 100, 129

(56) References Cited

U.S. PATENT DOCUMENTS

| | | | |
|---|---|---|---|
| 6,307,538 B1 | 10/2001 | Bacon | |
| 6,442,734 B1 * | 8/2002 | Hanson et al. | 716/4 |
| 6,460,094 B1 * | 10/2002 | Hanson et al. | 710/8 |
| 6,601,124 B1 * | 7/2003 | Blair | 710/305 |

* cited by examiner

*Primary Examiner*—Vijay Shankar
(74) *Attorney, Agent, or Firm*—Blakely, Sokoloff, Taylor & Zafman LLP

(57) ABSTRACT

An apparatus that includes a serial port configured to interface with a separate host, one serial interface engine (SIE) connected to the serial port, and at least a first interface unit and a second interface unit connected to the one serial interface engine. In one embodiment, the apparatus includes a virtual hub comprising a firmware unit configured to emulate a hub having multiple ports. In an alternative embodiment, the first interface unit is a keyboard interface, and the second interface unit is a flash media drive interface. In another alternative embodiment, is a Universal Serial Bus (USB) peripheral and the serial port is a Universal Serial Bus port. In another alternative embodiment, apparatus is housed within a keyboard.

9 Claims, 6 Drawing Sheets

INTEGRATED VIRTUAL HUB CHIP

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field

The present invention relates generally to serial bus hubs, and more specifically to an improved configuration of the same.

2. Background

Keyboards lend themselves as extension bases for other functions. For example, U.S. Pat. No. 5,841,424 describes a keyboard that has multiple extension bases with serial ports.

FIG. 1 shows an overview of a generic USB keyboard with additional extensions. Keyboard 100 contains a USB hub 110 with USB interface 105, which is connected through USB link 104 to a port 103 on the host computer system 101. USB hub 110 controls, in this example, a keyboard controller 131. The controller 131 has a keyboard matrix 132 and its own USB port 130, which connects to USB port 112 of hub 110. A card reader 120 is also present, with a media port 121. Card reader 120 has a port 113 that also connects to the USB hub 110 via USB port 111.

The approach shown in FIG. 1 results in a relatively expensive product. It requires at least three serial interface engines (SIEs), three processors or controllers (for each of the entities of the hub, the card controller, and the keyboard controller), and extra logic to handle general functions.

What is needed is an integrated, more cost-effective method that allows multiple, multi-pin devices to be connected via one USB line to a host computer, thus reducing the need for expensive multiple internal USB connections.

SUMMARY OF INVENTION

An embodiment of the present invention provides an apparatus that includes a serial port configured to interface with a separate host, one serial interface engine (SIE) connected to the serial port, and at least a first interface unit and a second interface unit connected to the one serial interface engine. In one embodiment, the apparatus includes a virtual hub comprising a firmware unit configured to emulate a hub having multiple ports. In an alternative embodiment, the first interface unit is a keyboard interface, and the second interface unit is a flash media drive interface. In another alternative embodiment, is a Universal Serial Bus (USB) peripheral and the serial port is a Universal Serial Bus port. In another alternative embodiment, apparatus is housed within a keyboard.

Other features and advantages of embodiments of the present invention will be apparent from the accompanying drawings, and from the detailed description, that follows below.

BRIEF DESCRIPTION OF DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

The virtual hub function is a component of the novel art of this disclosure. Said virtual hub represents the MFC and the keyboard in the current example as two USB entities connected to a hub; however, the physical hub is eliminated, resulting in a less costly approach.

Figure 1:
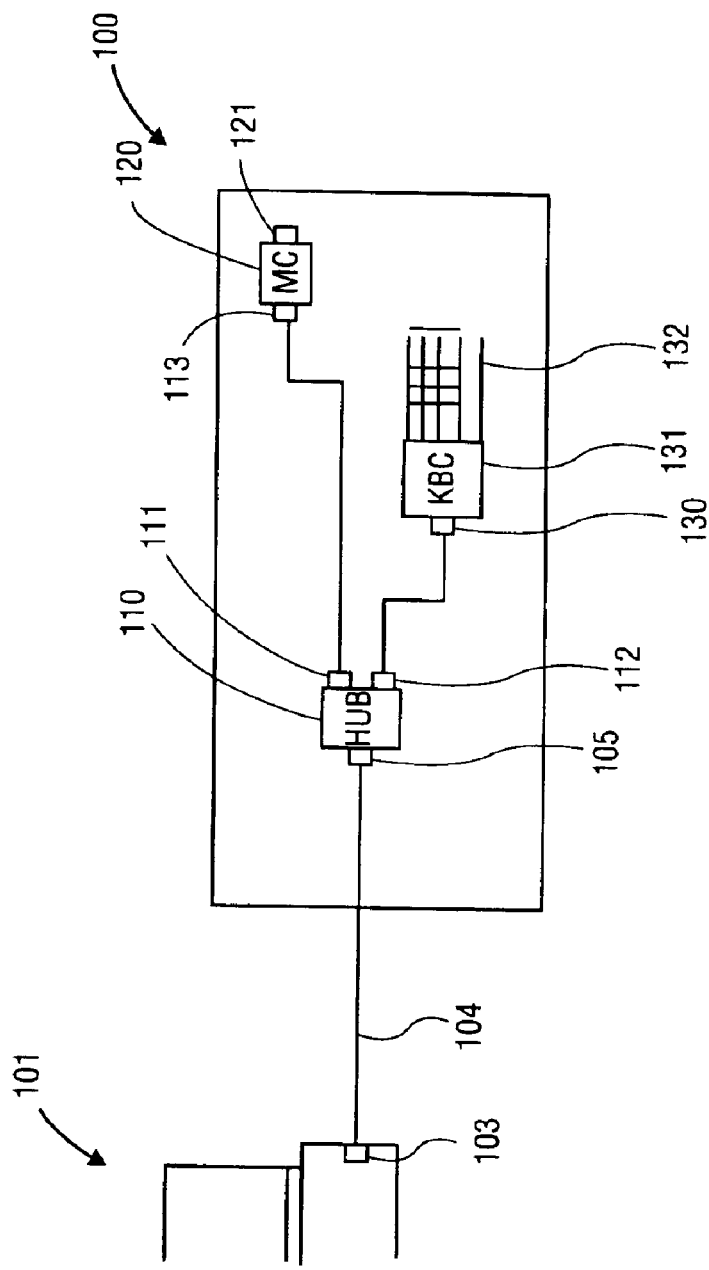
FIG. 1 illustrates a prior art USB keyboard with additional extensions.
Figure 2:
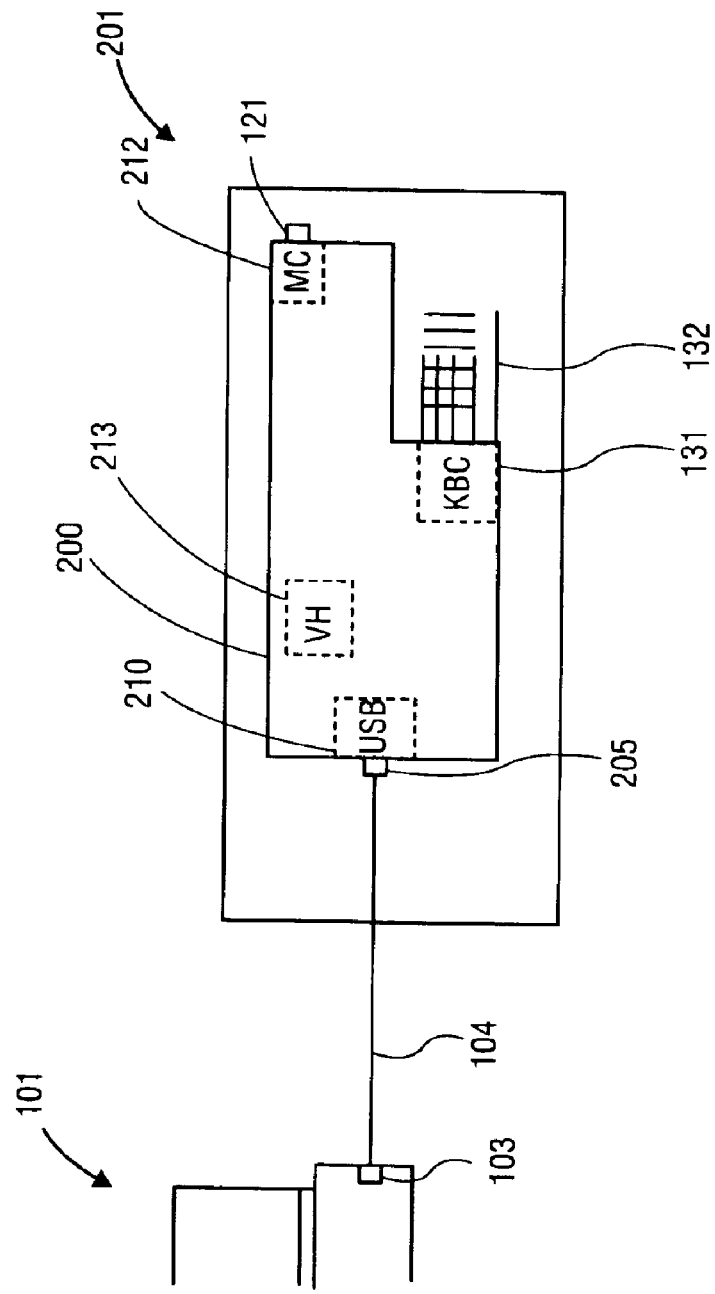
FIG. 2 illustrates block level illustration of the USB port and adjoining functionality, according to one embodiment.
Figure 3:
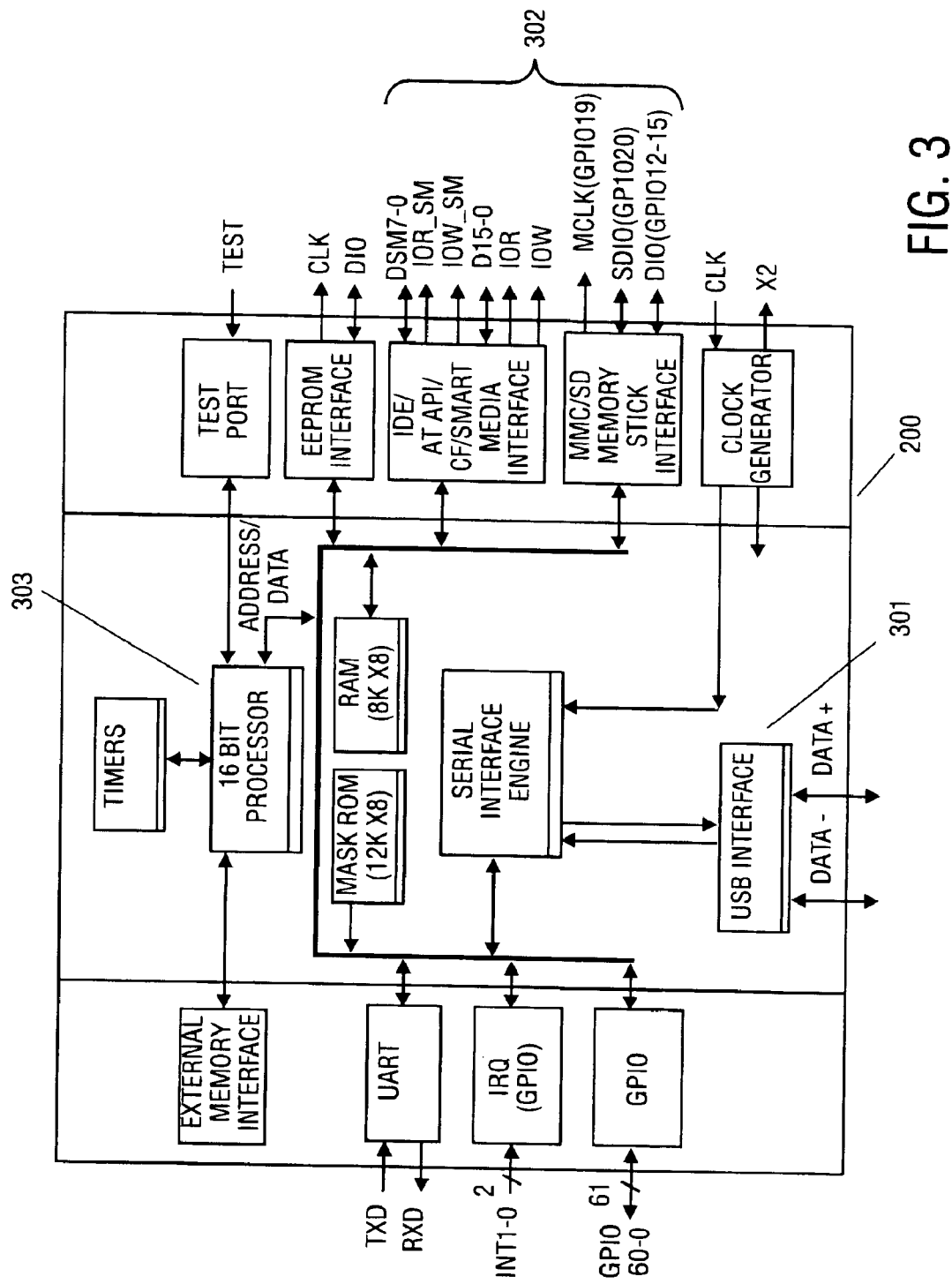
FIG. 3 illustrates an overview block diagram, according to one embodiment.

FIG. 3 is an overview block diagram of chip 200 as described in this embodiment. Chip 200 as shown in FIG. 3 contains typical elements of a normal embedded microcontroller. Of relevance to the novel art of this disclosure is USB interface section 301, the parallel I/O section 302, and the CPU 303. Also present are other functions often found in embedded microcontrollers.

Figure 4:
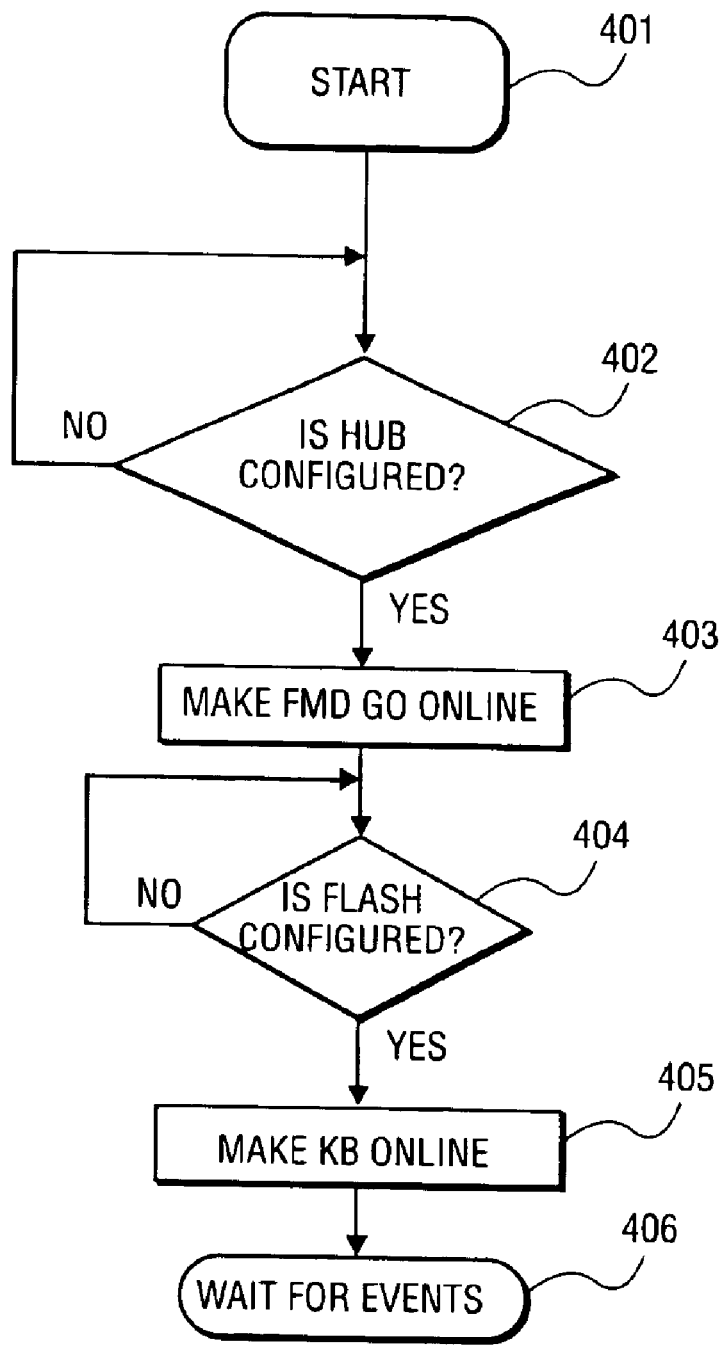
FIG. 4 illustrates flow diagram of the functional process, according to one embodiment.

FIG. 4 shows a simplified diagram of the functional process of the virtual hub. After initiation at step 401, the hub must be configured by software. This configuration step 402 may require repetitive attempts until the host CPU is ready to communicate with the hub and provide the configuration parameters. Once that step has been passed, in step 403 the flash media drive or flash card controller is brought online. In step 404, the drive or controller looks to see if any valid medium is present, and, if so, it configures the medium accordingly. Note that No Medium is also considered a valid configuration. Once the medium is configured, in step 405 the keyboard is brought online as an additional virtual USB device. After these steps, the initialization is complete, and normal operation commences at step 406.

Figure 6:
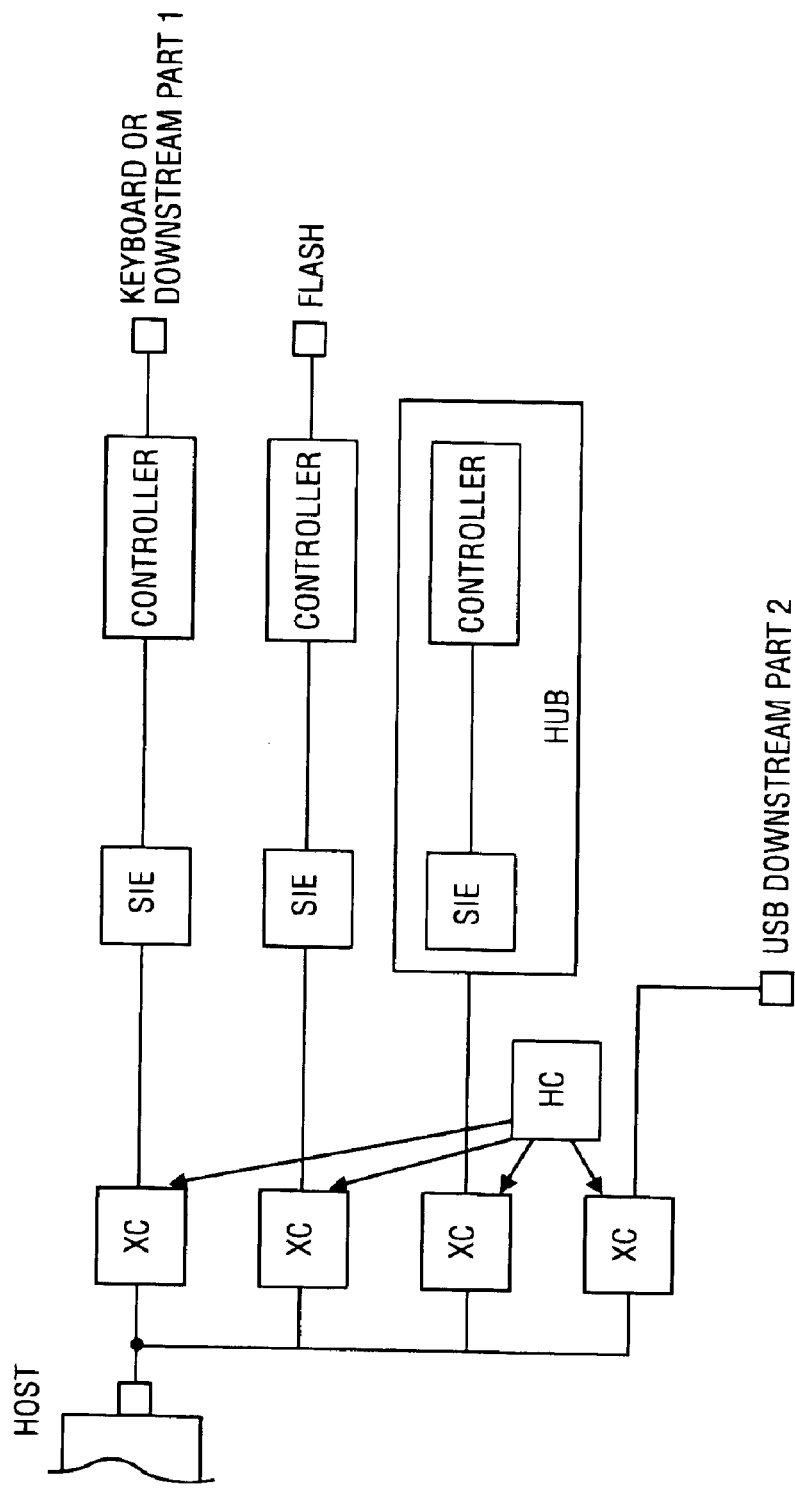
FIG. 6 illustrates a prior art USB keyboard with additional extensions, according to one embodiment.

FIG. 6 shows a conventional approach for a keyboard with an FMD, using three SIEs and three controllers, as a way used in current art to implement the same functionality, but at a much higher cost.

Figure 5:
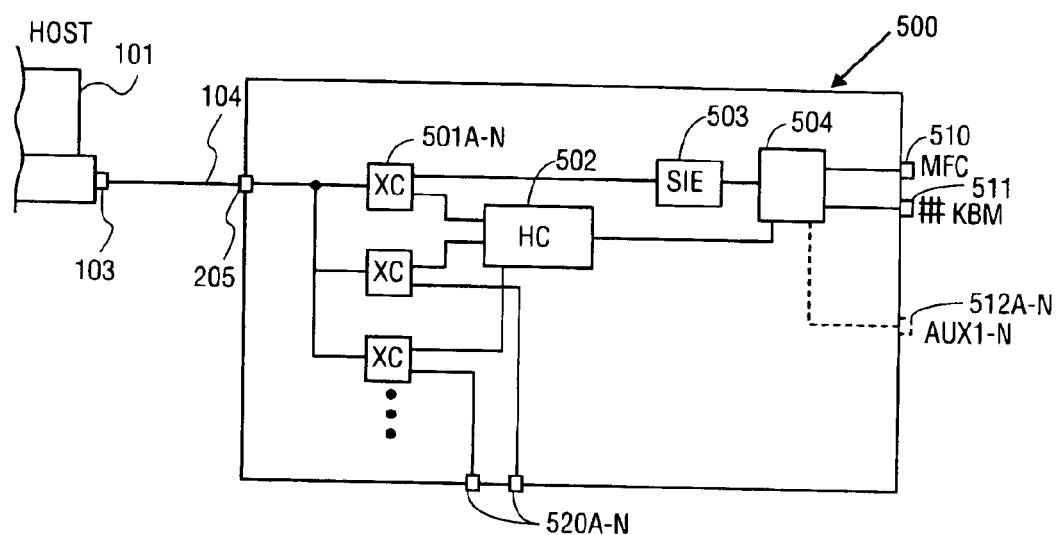
FIG. 5 illustrates block level illustration of the USB port and adjoining functionality, according to an alternative embodiment.

FIG. 5 shows host computer system 101 with port 103 connected through USB link 104 to USB port 205 of chip 500. Chip 500 is yet another embodiment, in this case with a more hybrid type of configuration. It contains a real hub function, multi flash interface 510, keyboard interface 511, and potentially additional auxiliary interfaces 512a–n. In some cases the keyboard interface 511 may not be implemented, but other auxiliary functions may. Such auxiliary functions may include analog and digital functions such as controlling or measuring voltages.

In this case the hub controller 502 is implemented using cross switches XC 501a–n (as is normally done in hubs). These switches 501a–n help the hubcontroller 502 to control the connectivity through its control lines to each of the cross switches. Two of the cross switches in this example are passed through as ports 520a–n to use for other (external) USB devices. Novel, however, is the use of a single SIE 503 for multiple internal functions. From SIE 503 the signals go into embedded controller 504, which controls the multifunction connector 510, the keyboard connector 511, and additional connectors 512a–n, as described above.

Those additional connectors can be used for other, additional functions to be integrated. In some instances, the pins used for the keyboard matrix may be used for other functions, depending on what kind of device or system the chip 500 is integrated. In some cases hub controller 502 and interface controller 504 are one and the same microcontroller, in some cases the hub controller is an intelligent peripheral to interface controller 504, and in some cases they are two separate microcontrollers communicating with each other. In yet other cases, hub controller 502 may have its own SIE, and interface controller 504 may also have its own SIE.

In some embodiments the hub controller 502 and the embedded controller 504 may share one CPU. In other embodiments, they may be separated, with the hub controller embodied entirely in hardware to provide sufficient speed for enhanced standards such as USB 2.0, etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An electronic apparatus comprising:
   a serial port configured to interface with a separate host;
   one serial interface engine (SIE) connected to the serial port;
   at least a first interface unit is a keyboard and a second interface unit is a flash media drive connected to the serial interface engine; and
   a virtual hub comprising a firmware unit configured to emulate a hub having multiple ports.

2. The apparatus of claim 1, wherein the first interface unit is a keyboard interface.

3. The apparatus of claim 2, wherein the second interface unit is a flash media drive interface.

4. The apparatus of claim 1, wherein the apparatus is housed within a keyboard.

5. The apparatus of claim 4, wherein the apparatus is a Universal Serial Bus (USB) peripheral and the serial port is a Universal Serial Bus port.

6. The apparatus of claim 1, wherein the serial interface engine is connected to a controller, and the first interface unit and the second interface unit are connected to the controller.

7. The apparatus of claim 1, wherein a third interface unit is connected to the serial interface unit.

8. The apparatus of claim 1, wherein the serial port, the serial interface engine (SIE), and the first interface unit and a second interface unit are integrated on a single device.

9. The apparatus of claim 1, wherein a third interface is connected to the serial port, the third interface having a second serial interface engine.

* * * * *